Patented Jan. 18, 1949

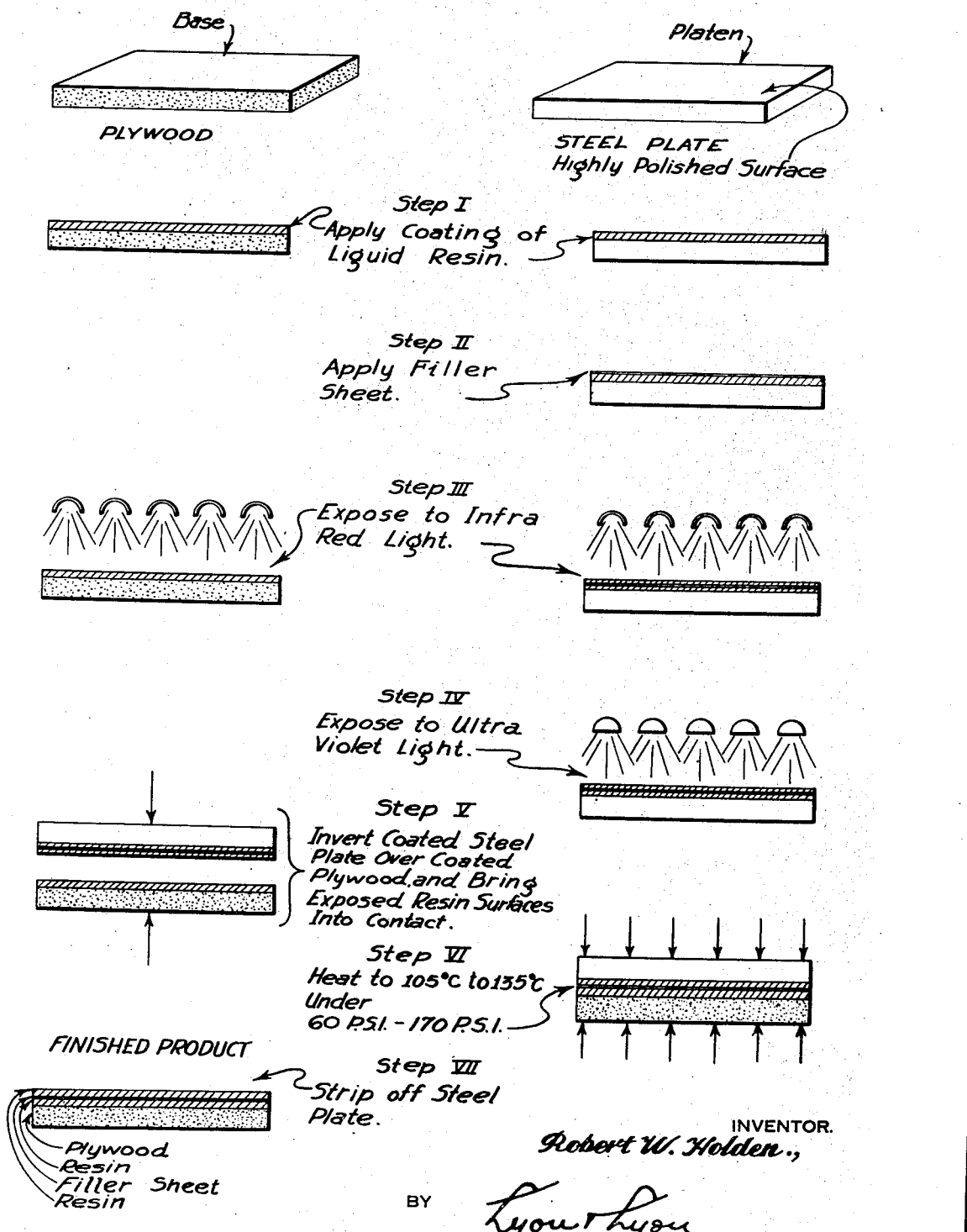

2,459,279

UNITED STATES PATENT OFFICE 2,459,279

PROCESS FOR PLASTIC COATING

Robert W. Holden, Burbank, Calif., assignor to Laminating Specialties, Inc., Burbank, Calif., a corporation of California Application June 24, 1947, Serial No. 756,659

9 Claims. (Cl. 154—99)

This invention relates to a process for producing a laminated article and to a method of coating a base material with a plastic compound.

This invention finds particular usefulness in connection with forming polyester resin surfaces on plywood or similar sheet materials, or on curved or contoured surfaces.

It is characteristic of such resins to pass through a soft jell-like stage commonly called a jell stage, as they pass from the liquid to the final thermoset and infusible form. The jell stage is of longer or shorter duration, dependent upon the composition of the resin used. I have found that the amount of resin which may be squeezed out under pressure between two surfaces can be controlled by pre-jelling the resin to a known stage where only the desired amount of flow will result under temperatures and pressures necessary to obtain the desired product. It is also necessary to eliminate the entrapment of air to avoid bubbles in the surface coating, or in the depressions in porous or uneven base materials being laminated. But I have found that by coating a platen such as a highly polished steel plate, and where necessary, also coating the base material with liquid resin and reducing the viscosity by heating to a temperature just below the polymerization point of the resin and holding it at such temperature for a short time, the entrapped air bubbles will rise to the surface and leave a perfect surface against the platen or the base material.

The drawings illustrate the various steps in a process embodying a preferred form of my invention.

As shown in the drawings, a base to be coated, such as a plywood sheet and a platen comprising a steel plate with a highly polished surface, are each coated with a polyester resin. The resin is in liquid form and is preferably applied with a device such as a glue spreader. The composition of the polyester resin employed is not important, and any one of a number of commercially available polyester base resins may be used, it being desirable that the resin be of low volatility, and hence possess a low styrene content.

Before application, the resin is first catalyzed with any normal oxygen release agent, such as, for example, benzoyl peroxide, lauroyl peroxide, tertiary butyl hydro peroxide, etc. The resin is then treated to ensure rapid jellation by the use of the tertiary amines or other agents capable of inducing jellation at low temperatures, or in unusually short times. The resin may be further modified to increase the photo sensitivity to a degree where jellation can be obtained uniformly and quickly by the action of ultra-violet rays in the general range of 3500 angstrom units, but without carrying the reaction beyond the soft jell stage desired. This modification may be accomplished by the addition of various diketones, benzoin oxime, or certain organic halides.

After the resin has been spread in liquid form on the surface of the plywood and platen, a decorative absorbent paper, or other filler material such as fabrics, may then be rolled onto the resin coated platen as shown in step 2. The filler sheet is preferably absorbent so that the resin soaks through it and remains on both sides of the sheet. The coated platen and coated base are then moved along belts over which is suspended first a bank of infrared lamps, which heat and soften the resin and permit entrapped air bubbles to rise to the surface. This operation is illustrated in step 3 in the drawings. The belt carrying the platen then carries it under a bank of ultra-violet lamps that bring the resin to the proper jell stage against the polished surface of the platen. This operation is illustrated in step 4 in the drawings.

Since the resin is no longer adhesive when jelled, it is necessary to have the exposed surface in an unjelled condition for later assembly and adhesion to the resin on the base material. The surface of the resin, even while under exposure to ultra-violet lamps, retains its original "tackiness" because of natural air sensitivity which prevents the exposed surface or surfaces from jelling. The rate of belt movement under the ultra-violet lamps is controlled so that the desired pre-jell stage is obtained during the period of exposure.

The coated platen is then inverted over the coated plywood and the exposed surface of the resin is brought into contact as illustrated in step 5 in the drawings. The entire assembly, including the steel platen, plywood base and resin coatings, are then subjected to pressure on the order of 60 to 170 p. s. i., and are simultaneously heated to temperatures ranging from 105° C. to 135° C. for a time varying from 6 minutes to 20 minutes, depending upon the particular base material and the desired resin thickness. The resin coating on the platen merges integrally with the resin coating on the base material. The platen may be stripped from the assembly while hot since the jelled portion of the resin has prevented any substantial bond from forming between the resin and the platen. The finished laminated product is shown in the drawings at step 7.

Various modifications may be employed in connection with this process without departing from the spirit of the invention; for example, it is contemplated that contoured surfaces may be employed instead of flat surfaces as described, and as shown in the drawings. In such case, the resin may be sprayed onto the countoured surfaces rather than applied with a glue spreader. In certain cases it may be unnecessary or undesirable to coat the base material with liquid resin, and in such case, the first contact of resin with the base material occurs in step 5 when the coated platen and the base material are brought together; furthermore, it may be desirable to place a decorative sheet, or other filler material or fabric, on both the coated platen and coated base, instead of only on the coated platen as shown in step 2 of the drawings.

Infrared lights can be used to produce the desired pre-jell without the use of the ultra-violet lights, in certain instances. For heavily pigmented materials it is possible to produce the desired pre-jell by using infrared lamps alone, or the same effect can be produced in an oven. However, the control of this process is critical and it is difficult to produce just the desired hardness of pre-jell. In other cases involving transparent materials, it has been found essential to employ the ultra-violet lamps in addition to the infrared lamps in order to obtain the satisfactory control of the pre-jell.

These and other variations may be made from the specific detailed process described above without departing from the scope of the invention as defined in the following claims.

I claim:

1. A process for producing a laminated article, comprising the steps of coating a flat or contoured platen with a polyester base resin in liquid form, exposing the resin to ultra-violet light to harden the resin as a pre-jell against the platen while the exposed surface of the resin remains "tacky," bringing a base into contact with the exposed resin surface, heating the resin while maintaining it under pressure between the base and the platen, and subsequently stripping the platen from the resin and base.

2. A process for producing a laminated article, comprising the steps of coating a flat or contoured platen with a polyester base resin in liquid form, exposing the resin to ultra-violet light to harden the resin as a pre-jell against the platen while the exposed surface of the resin remains "tacky," bringing a resin-coated base into contact with the exposed resin surface, heating the resin while maintaining it under pressure between the base and the platen, and subsequently stripping the platen from the resin and base.

3. A process for producing a laminated article, comprising the steps of coating a platen with a polyester resin in liquid form, exposing the resin to ultra-violet light to harden the resin as a pre-jell against the platen while the exposed surface of the resin remains "tacky," bringing a base into contact with the exposed resin surface, heating the resin to 105° C.–135° C. while maintaining it under pressure between the base and the platen, and subsequently stripping the platen from the resin and base.

4. A process for producing a laminated article, comprising the steps of coating a metal platen with a polyester resin in liquid form, exposing the resin to ultra-violet light to harden the resin as a pre-jell against the platen while the exposed surface of the resin remains "tacky," bringing a base into contact with the exposed resin surface, heating the resin to 105° C.–135° C. while maintaining it under a pressure of 60 p. s. i.–170 p. s. i., and subsequently stripping the platen from the resin and base.

5. A surface coating process, comprising the steps of applying a polyester base resin in liquid form to the surface of a platen, heating the resin on the platen by exposure to infrared light to remove entrapped air bubbles, subjecting the resin to ultra-violet light to harden the resin as a pre-jell against the platen while allowing the exposed surface thereof to remain in a "tacky" condition, bringing the exposed surface of the resin into contact with a base, and heating the resin while maintaining it under pressure between the base and platen.

6. A surface coating process, comprising the steps of applying a polyester base resin in liquid form to the surface of a base and to a platen, subjecting the resin on the platen to heat and then to ultra-violet light to harden the resin as a pre-jell against the platen while allowing the exposed surface thereof to remain in a "tacky" condition, bringing into contact the exposed surfaces of the resins on the platen and base, and heating the resins while maintaining them under pressure between the base and the platen.

7. A surface coating process, comprising the steps of applying a polyester resin in liquid form to the surface of a base and to a metal platen, applying a decorative filler to the resin on the platen, subjecting the resin on the platen to ultra-violet light to harden the resin as a pre-jell against the platen while allowing the exposed surface thereof to remain in a "tacky" condition, bringing into contact the exposed surfaces of the resins on the platen and base, heating the assembly to a temperature of 105° C.–135° C. while maintaining the resins under a pressure of 60 p. s. i.–170 p. s. i., and finally stripping off the platen.

8. A surface coating process, comprising the steps of applying a polyester resin in a liquid form to the surface of a base and to a metal platen, heating the resin on the base and platen by exposure to infra-red light to remove entrapped air bubbles, subjecting the resin on the platen to ultra-violet light to harden the resin as a pre-jell against the platen while allowing the exposed surface thereof to remain in a "tacky" condition, bringing the resins on the platen and base into contact, heating the assembly to a temperature of 105° C.–135° C. while maintaining the resins under a pressure of 60 p. s. i.–170 p. s. i., and finally stripping off the platen.

9. A surface coating process, comprising the steps of spreading a polyester resin in liquid form to the surface of a base and to a metal platen, applying a decorative absorbent sheet to the resin on the platen, heating the resin on the base and platen by exposure to infra-red light to remove entrapped air bubbles, subjecting the resin on the platen to ultra-violet light to harden the resin as a pre-jell against the platen while allowing the exposed surface thereof to remain in a "tacky" condition, bringing the resins on the platen and base into contact, heating the assembly to a temperature of 105° C.–135° C. while maintaining the resins under a pressure of 60 p. s. i.–170 p. s. i., and finally stripping off the platen.

ROBERT W. HOLDEN.

REFERENCES CITED

The following references are of record in the file of this patent:

UNITED STATES PATENTS

| Number | Name | Date |
| --- | --- | --- |
| 1,793,667 | Baldwin | Feb. 24, 1931 |
| 2,268,611 | Mitchell | Jan. 6, 1942 |
| 2,273,891 | Pollack et al. | Feb. 24, 1942 |
| 2,367,670 | Christ | Jan. 23, 1945 |
| 2,384,119 | Muskat et al. | Sept. 4, 1945 |

OTHER REFERENCES

"Tailor Made Polyester Resin," Modern Plastics, October 1947, pages 111 to 115.